United States Patent [19]
Liegel et al.

[11] Patent Number: 5,925,874
[45] Date of Patent: Jul. 20, 1999

[54] MICROSCOPE WITH AN AUTOFOCUS ARRANGEMENT HAVING A VARIABLE MAGNIFICATION SYSTEM

[75] Inventors: Jurgen Liegel; Hartmut Wolf, both of Oberkochen; Dieter Quendt, Essingen, all of Germany

[73] Assignee: Carl-Zeiss-Stiftung, Germany

[21] Appl. No.: 08/882,686

[22] Filed: Jun. 25, 1997

[30] Foreign Application Priority Data

Jun. 29, 1996 [DE] Germany .............................. 196 26 170

[51] Int. Cl.⁶ ...................................................... G01J 1/20

[52] U.S. Cl. ......................... 250/201.3; 250/216; 359/380

[58] Field of Search .................................. 250/201.3, 216, 250/201.2, 201.8; 359/380, 368, 376–378

[56] References Cited

U.S. PATENT DOCUMENTS

| | | | |
|---|---|---|---|
| 5,270,527 | 12/1993 | Salzmann | 250/201.3 |
| 5,288,987 | 2/1994 | Vry et al. | 250/201.3 |

FOREIGN PATENT DOCUMENTS 80 00069   7/1981   France .

*Primary Examiner*—Que Le

[57] ABSTRACT

In a microscope with an objective, a variable magnification system and an autofocus arrangement, the autofocus arrangement produces a projection beam path for the projection of an autofocus marking onto an observation object, and an imaging beam path which passes through an objective, for imaging on a detector the autofocus marking projected onto the observation object. The projection beam path and/or the imaging beam path then passes through the variable magnification system outside its optical axis.

11 Claims, 5 Drawing Sheets

MICROSCOPE WITH AN AUTOFOCUS ARRANGEMENT HAVING A VARIABLE MAGNIFICATION SYSTEM

BACKGROUND OF THE INVENTION

1. Field of the Invention

This invention relates to a microscope with an observation optics and with an autofocus arrangement, and more particularly to a microscope in which the observation optics includes an objective through which at least one observation beam path passes and a variable magnification system, and the autofocus arrangement includes a projection beam path which passes through the objective for the projection of an autofocus marking on an observation object, and an imaging beam path which passes through the objective and the variable magnification system for imaging on a detector the autofocus marking projected onto the observation object.

2. Discussion of Prior Art

A microscope of this kind is known from French Utility Model 80 00069. This known microscope is constructed such that the projection beam path passing through the objective is coupled, between a first and a second lens of a condenser, into the illumination beam path of the microscope by means of a mirror or a Lummer cube. In this case, the condenser lens in the illumination beam path, through which lens the projection beam path passes and which affects the projection of the autofocus marking, is particularly matched to the autofocus radiation, which is infrared in this case.

SUMMARY OF THE INVENTION

The object of the invention is to provide a microscope with an autofocus arrangement, having as simple as possible a construction and an improved autofocus function.

The object of the invention is achieved by a microscope having the following features:

Observation optics that includes an objective through which at least one observation beam path passes and a variable magnification system having an optical axis.

An autofocus arrangement that includes a projection beam path passing through the objective for projection of an autofocus marking on an observation object and an imaging beam path passing through the variable magnification system for imaging on a detector the autofocus marking projected onto the observation object.

The projection beam path and/or the imaging beam path passes through the variable magnification system outside of its optical axis.

This objective is attained, according to the invention, with the microscope of this kind, in that either or both of the imaging beam path or the projection beam path pass through the variable magnification system outside of its optical axis.

By means of the microscope according to the invention, the imaging, that is, reducing and enlarging, properties of the variable magnification system are used for the autofocus function. Furthermore, in contrast to the cited state of the art, no additional optical elements are inserted into the illumination beam path, and the illumination beam path does not have to be matched either to additional optical elements or to the autofocus radiation.

The variable magnification system can be, for example, a pancratic system (zoom) or a magnification changer, in which respective different lens systems can be pivoted into and out of the observation beam path.

A special autofocus principle which is particularly advantageous in connection with this invention is described in German Patent DE 41 31 737 A1 (U.S. Pat. No. 5,288,987). The content of this document, in regard to the autofocus principle described there and in regard to the components which are required for its realization, is expressly incorporated by reference into this Application. In the autofocus principle described in this document, a defocusing of the microscope leads to a displacement of the image of the autofocus marking on the detector, wherein the image displacement and the defocusing are proportional to each other.

According to the invention, the proportionality constant between defocusing and image displacement is increased with increasing magnification of the variable magnification system. As against the proportionality constant of the autofocus arrangement of DE 41 31 737 A1 (U.S. Pat. No. 5,288,987), it differs by a factor of the square of the magnification, and it differs from the autofocus arrangement known from French Utility Model 80 00069 by a factor of the magnification. The off-axis path of at least one of the two autofocus beam paths through the variable magnification system thus leads to a higher autofocus accuracy or autofocus sensitivity.

The invention even has an improved autofocus function, as against the known autofocus microscopes, when the variable magnification system has a magnification region with "magnification"<1, that is, the image displacement is smaller at the same defocusing.

In the first place, the reason for this is that the total magnification of the microscope in this magnification region of the variable magnification system is rather low, and the depth of focus is rather large. At a large depth of focus, however, the requirements on the accuracy of the autofocus system become looser. In the second place, a reduced proportionality constant between the image displacement on the detector and the defocusing leads to the detector having an increased measurement region or response region or "capture" region relating to the defocusing. That is, with a variable magnification system which is producing a reduction (magnification<1), the imaging of the autofocus marking is still sensed by the detector, even at relatively large defocusing.

In an advantageous embodiment, the projection beam path, the imaging beam path and the at least one observation beam path pass through respectively different regions of the same objective and of the same variable magnification system. In this manner, the at least one observation beam path can remain completely unaffected by the autofocus arrangement.

This can be attained, for example, in a monoscopic microscope with only one single observation beam path coaxial with the optical axis, in that the two autofocus beam paths pass through the objective and the variable magnification system radially outside the middle observation beam path, while with a stereo microscope which includes two observation beam paths, for example, the plane of the observation beam paths had to be rotated by 90° with respect to the plane of the autofocus beam paths.

In particular, it can however also be advantageous in a stereo microscope, in relation to narrowed space requirements, if the projection beam path and/or the imaging beam path pass at least partially through one of the regions of the objective through which the observation beam paths pass.

In an embodiment as a stereo microscope with a so-called single channel optics, that is, the objective and the variable magnification system have a single common optical axis and the two observation beam paths pass through different regions of the same objective and the same variable magnification system, the off-axis autofocus beam path in the variable magnification system according to the invention can constructionally be particularly simply attained.

When a coupling-in device couples the projection beam path into the observation optics in the vicinity of a stop which is included in the observation optics, and/or a coupling-out device couples out the imaging beam path in the vicinity of this stop and deflects it to the detector, vignetting can be prevented or minimized, and this is also advantageous in regard to as large as possible an object field which can be evaluated by the autofocus function, and for as large as possible an autofocus measurement region.

In a further embodiment, the projection beam path and/or the imaging beam path pass through an afocal reversal system which is included in the observation optics and which images a stop or a pupil plane, which follows the reversal system, into the variable magnification system. This reversal system makes possible a compact construction of the variable magnification system. In this embodiment, the coupling-in or coupling-out of the projection beam path or of the imaging beam path into or out of the observation optics takes place in the vicinity of the plane of the stop and in a section with parallel beams, so that particularly favorable conditions result in relation to vignetting and imaging properties. Special precautions would otherwise be necessary to insure the Scheimpflug condition, since misaligned optical axes arise on coupling-in or coupling-out in a region with non-parallel beams.

In another embodiment with an afocal reversal system, a coupling-out device couples the imaging beam path out of the observation optics in a section of the reversal system having convergent beams. Firstly, for reasons of space, this region is particularly suitable for the arrangement of the detector which follows the coupling-out device. Secondly, in this embodiment it is possible to dispense with an additional imaging optics for the imaging beam path, since the coupling-out in fact takes place in a section with convergent beams.

In this embodiment, the coupling-out device can have a simple construction when a deflecting prism which deflects the at least one observation beam path is arranged in front of an intermediate image plane in the section of the afocal reversal system having the coupling-out device, and the coupling-out device is a prism section arranged on the deflecting prism in the region of the imaging beam path, such that the thickness of glass in the deflecting prism through which the at least one observation beam path passes is equal to the thickness of glass passed through by the autofocus imaging beam path in the deflecting prism and in the prism section forming the coupling-out device. No further optical elements are then required for imaging on the detector. Here the detector only has to be arranged so that the air path from the prism section forming the coupling-out device to the detector is equal to the air path from the deflecting prism to the intermediate imaging plane of the observation optics.

In a further embodiment, a coupling-in device couples the projection beam path into the observation optics between the variable magnification system and an afocal reversal system included in the observation optics, and/or a coupling-out device couples the imaging beam path out of the observation optics between the variable magnification system and the afocal reversal system. In a case in which the variable magnification system is afocal, coupling in or out is effected, in this embodiment also, in an advantageous manner in the region having parallel beams. Furthermore, the place of coupling in or out can lie closer, in this embodiment, to an image of the stop, already mentioned hereinabove, arranged in the observation beam path, usually after the variable magnification system, and thereby the pupillary diameter, and thus the usable field region of the autofocus beam paths, can be larger.

When the observation optics of the at least one observation beam path forms an image in at least one electronic imaging unit, e.g., a video camera with or without a preceding video adapter, and the electronic imaging unit is at the same time the detector, a separate detector of the autofocus arrangement, e.g., a row of diodes with a preceding detection optics, can be dispensed with. In this embodiment, the coupling-in of the autofocus beam paths can selectively take place at one of the positions mentioned above in connection with the other embodiment examples.

It is advantageous for this embodiment if the autofocus arrangement evaluates a signal which is formed by subtraction of an image of the observation object without autofocus marking from an image of the observation object with autofocus marking. Autofocus beams in the visible spectral region can thereby be used, so that the user of the microscope can, based on the visible projection, suitably for a comparatively short time, of the autofocus marking on the observation object, can assess which region of the object field is used for autofocusing. Furthermore, in this subtraction procedure, video cameras can be used which only need to be sensitive in the visible wavelength region.

Particularly when, in the case of a stereo microscope, two video cameras are used, further advantages result. Thus the signals of the two cameras can be added for noise reduction, or the signal from a single camera can be used exclusively when, for example, the image of the other camera is unsuitable due to edges in the object field.

BRIEF DESCRIPTION OF THE DRAWINGS

The invention is described hereinbelow with reference to preferred embodiments, taken together with the accompanying drawings, in which.

DETAILED DESCRIPTION OF PREFERRED EMBODIMENTS

Figure 1:
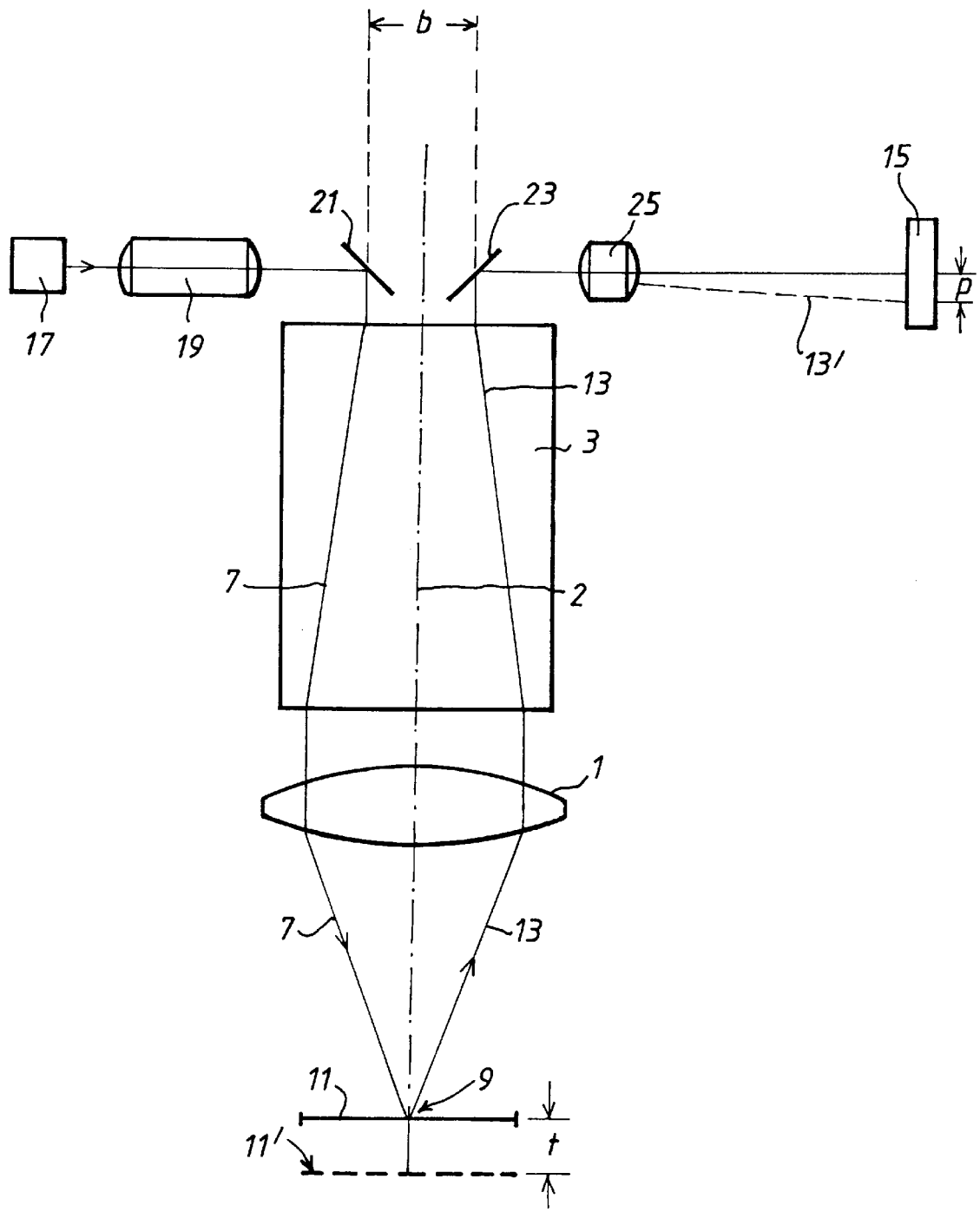
FIG. 1 shows a schematic diagram of a microscope according to the invention, in an axial longitudinal section along its optical axis.

The elements of a microscope according to the invention which are important for the invention are shown in FIG. 1, in which an objective is denoted by 1, the optical axis of the microscope by 2, and a variable magnification system by 3. In this embodiment, the optical axis 2 of the objective 1 is at the same time the optical axis of the variable magnification system 3. An autofocus arrangement produces a projection beam path 7 which passes through both the objective 1 and also the variable magnification system 3, respectively outside the optical axis 2, and is focused on a position-sensitive detector 15, for example a row of diodes.

The projection beam path 7 starts from a laser diode 17, which preferably emits in the infrared. A laser optics then forms the infrared radiation coming from the laser diode 17 in such a manner that the projection beam path 7, after being deflected by a deflecting element 21, for example, a mirror or a prism, and after passage through the variable magnification system 3 and the objective 1 produces a datum line, the width of which is limited by diffraction, on the observation object 11 as a marking 9.

The autofocus marking 9 is then imaged on the detector 15 by means of the objective 1, the variable magnification system 3, a further deflecting element 23, and a detection optics 25. The autofocus principle of this embodiment is disclosed in detail in DE 41 31 737 A1. However, the invention can be used, not only with this autofocus principle, but also with all autofocus principles in which a marking is projected onto the observation object and is thereafter imaged on a detector.

For an observation object which is in focus, the marking 9 is imaged in the middle of the detector 15. When the observation object is not in focus, and here lies at 11', for example, the marking is imaged at a region of the detector which is at a distance from the middle of the detector 15, as is indicated in FIG. 1 by the imaging beam path 13', shown dashed. With an off-axis passage of the autofocus beam paths through the variable magnification system 3, the distance p, sketched on the detector, of the marking image from the middle of the detector 15 is a measure for the defocusing amount t, that is, for the distance t of the object 11' from the focal plane:

$$p = \frac{b}{f_{HO}^2} \cdot f_D \cdot \Gamma^2 \cdot t, \quad \text{for } t \ll f_{HO}$$

with
b=autofocus base (sketched in FIG. 1 as the distance of the projection beam path 7 and the imaging beam path 13 in the region between the variable magnification system and the deflecting element 21 or 23),
$f_{HO}$=focal length of the objective 1,
$f_D$=focal length of the detection optics 25,
$\Gamma$=enlargement of the variable magnification system 3.

This equation holds for the case, shown in FIG. 1, that both the projection beam path 7 and also the imaging beam path 13 pass through the variable magnification system 3 outside its optical axis. If only the projection beam path 7 or only the imaging beam path 13 passes through the variable magnification system 3 outside the optical axis, in the above equation only the factor $\Gamma^2$ has to be replaced by the factor $\Gamma(\Gamma+1)/2$, for an arrangement which is otherwise analogous to FIG. 1, with the same autofocus base b.

At a given defocusing amount t, the distance p of the image of the marking from the middle of the detector 15 and thus the autofocus accuracy increases with the square of the magnification $\Gamma$ of the variable magnification system.

Figure 2:
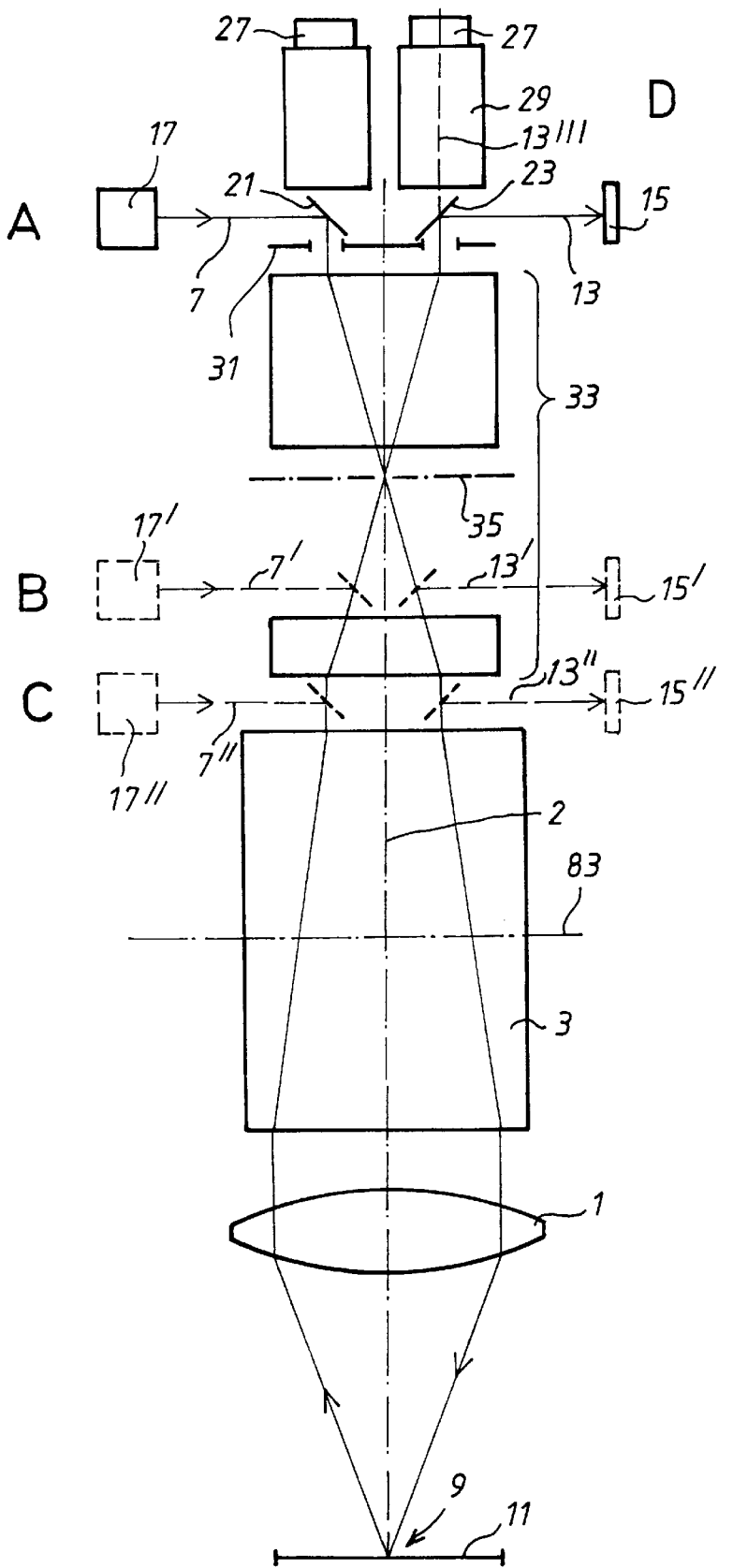
FIG. 2 shows a schematic overview diagram of further different embodiments, in axial longitudinal section.

Different embodiments of the invention in a video stereo microscope are shown in FIG. 2 by the letters A, B, C and D. The elements which correspond to the elements of FIG. 1 have the same reference symbols.

A video camera is denoted by 27 in FIG. 2, and is associated with a respective one of the stereo observation beam paths of the stereo microscope. These video cameras are, for example, CCD cameras, and a respective video adapter 29 precedes the video camera 27. Furthermore, an afocal 29 precedes the video camera 27. Furthermore, an afocal reversal system 33 can be recognized in FIG. 2, and an intermediate image plane 35 of the object 11 lies in its region.

In the embodiment shown in FIG. 2 by the letter A and the autofocus beam paths 7 and 13 drawn in full line, the autofocus beam paths 7 and 13 are coupled in or out in the observation beam direction, that is, in the direction from the object 11 to the video camera 27, after a stop 31 in the observation optics of the microscope.

Figure 3:
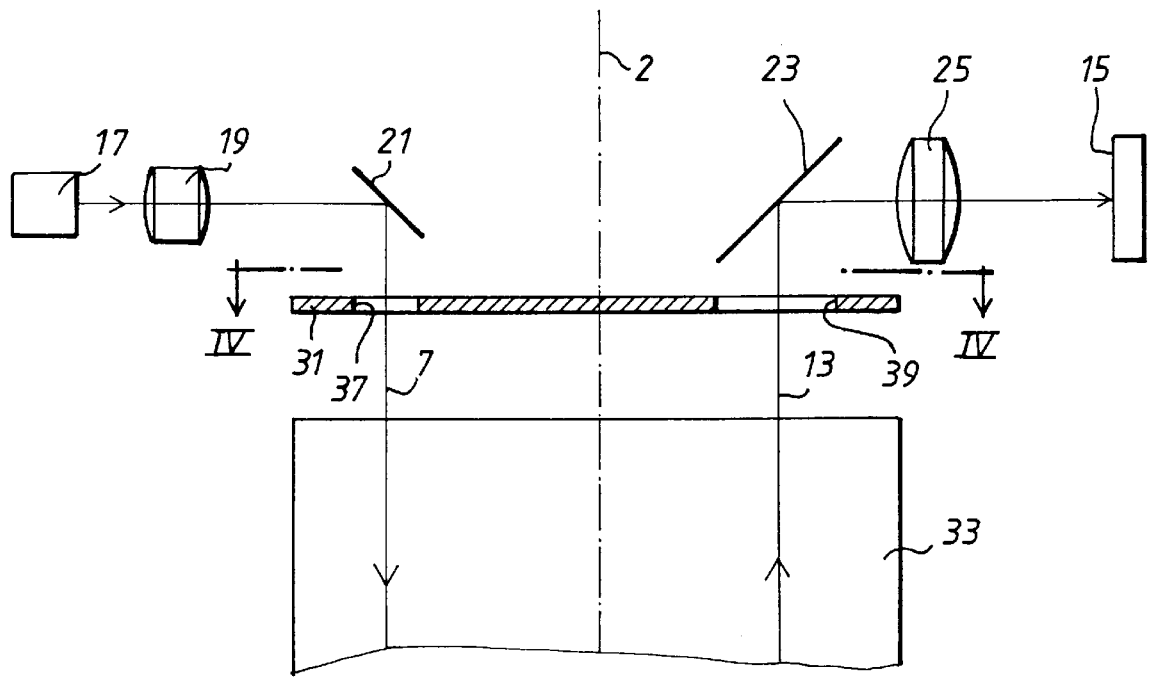
FIG. 3 shows a detail of one of the embodiments of FIG. 2, in schematic axial longitudinal section.
Figure 4:
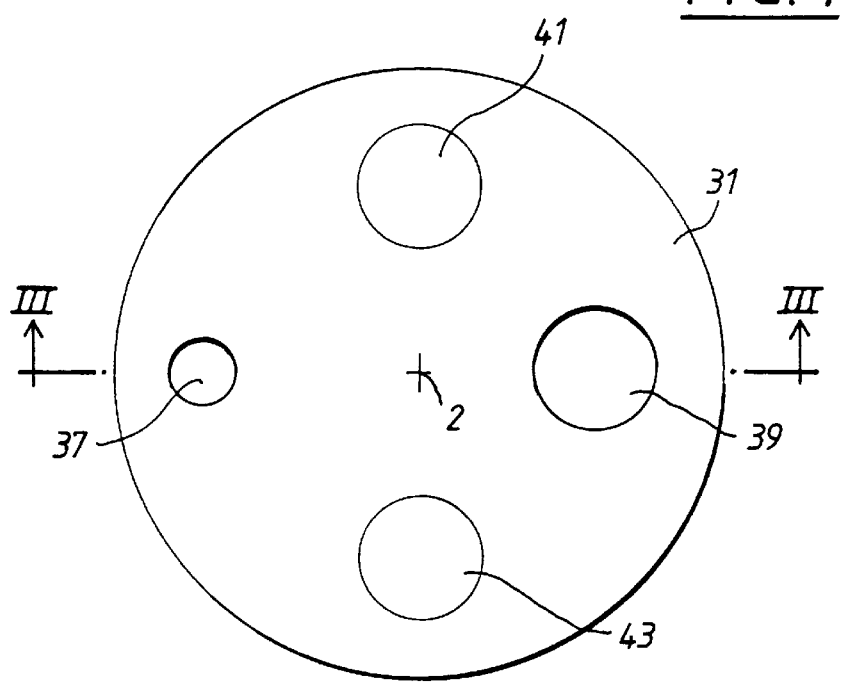
FIG. 4 shows a sectional view, seen in the direction of the arrow IV of FIG. 3.

This first embodiment is shown in FIGS. 3 and 4 as a detail drawing in which elements corresponding to elements which have already been mentioned are denoted by the identical symbols.

As can be seen in FIG. 3, the diaphragm 31 has a passage opening 37 for the projection beam path 7 of the autofocus arrangement and a passage opening 39 for the imaging beam path 13.

The stop 31, together with the autofocus passage openings 37 and 39, can be seen in the plan view of FIG. 4. As is clear from the equation which was given previously, as great as possible a distance of the two passage openings 37 and 39 is advantageous for the autofocus accuracy (this distance determines the autofocus base denoted by b in FIG. 1). Passage openings for the two observation beam paths of the stereo microscope are furthermore shown in FIG. 4. It is clear that mutual interference of the autofocus beam paths and the observation beam paths can be prevented by this arrangement of the passage openings 37, 39, 41 and 43.

In the embodiment denoted by A in FIG. 2, no vignetting occurs due to the coupling-in of the projection beam path 7 and/or the coupling-out of the imaging beam path 13, taking place substantially in the plane of the stop 31. This is of advantage with regard to as large as possible an object field which can be evaluated for autofocusing and with regard to as great as possible a defocusing response region.

Figure 5:
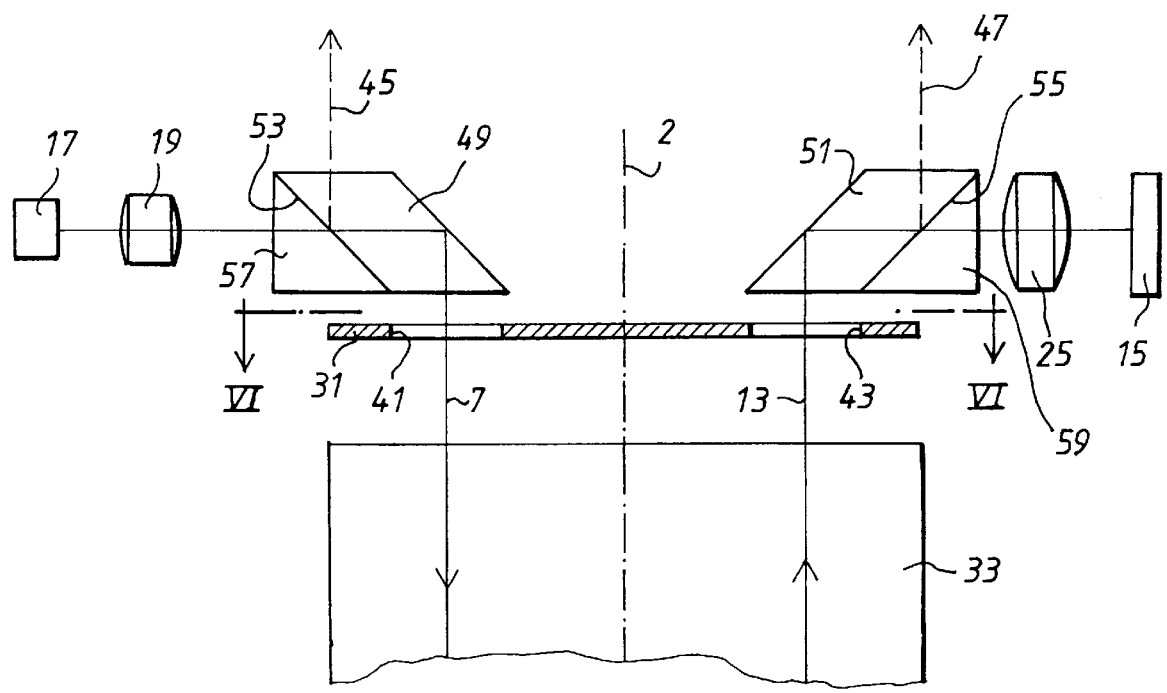
FIG. 5 shows a modification of the embodiment of FIG. 4, in axial longitudinal section.
Figure 6:
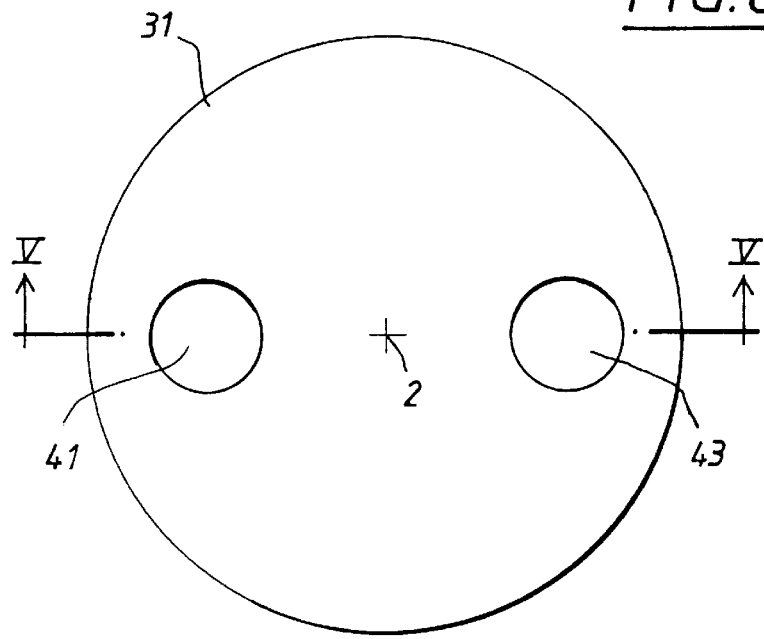
FIG. 6 shows a sectional view, seen in the direction of the arrow VI of FIG. 5.

Should the distribution of the passage openings 37, 39, 41 and 43 shown in FIG. 4 not be possible because of limited constructional space, a solution can also be chosen as sketched in FIGS. 5 and 6. The elements corresponding to elements which have already been mentioned are again denoted in FIGS. 6 and 7 by the identical symbols.

In the variant of the embodiment A (FIG. 2) shown in FIGS. 5 and 6, the autofocus beam paths 7 and 13 are coupled into or out of the observation beam paths 45 and 47. Dichroic beam splitter layers 53 and 55, for coupling the autofocus beams in or out, which advantageously lie in the infrared, are formed on rhombus prisms 49 and 51 which serve to enlarge the stereo base for the stereo observation beam paths 45 and 47. These dichroic beam splitter layers 53 and 55 lie, in the embodiment shown, between the rhombus prisms 49 and 51 and auxiliary prisms 57 and 59 which are cemented to the rhombus prisms 49 and 51.

In a further embodiment, which is denoted by B in FIG. 2, the autofocus beam paths 7' and 13' (shown dashed for embodiment B in FIG. 2) are coupled in or out within the afocal reversal system 33, before the intermediate image plane 35 in the observation beam direction. This embodiment is of particular advantage when the observation beam paths are folded at this place, as is shown in FIG. 7.

Figure 7:
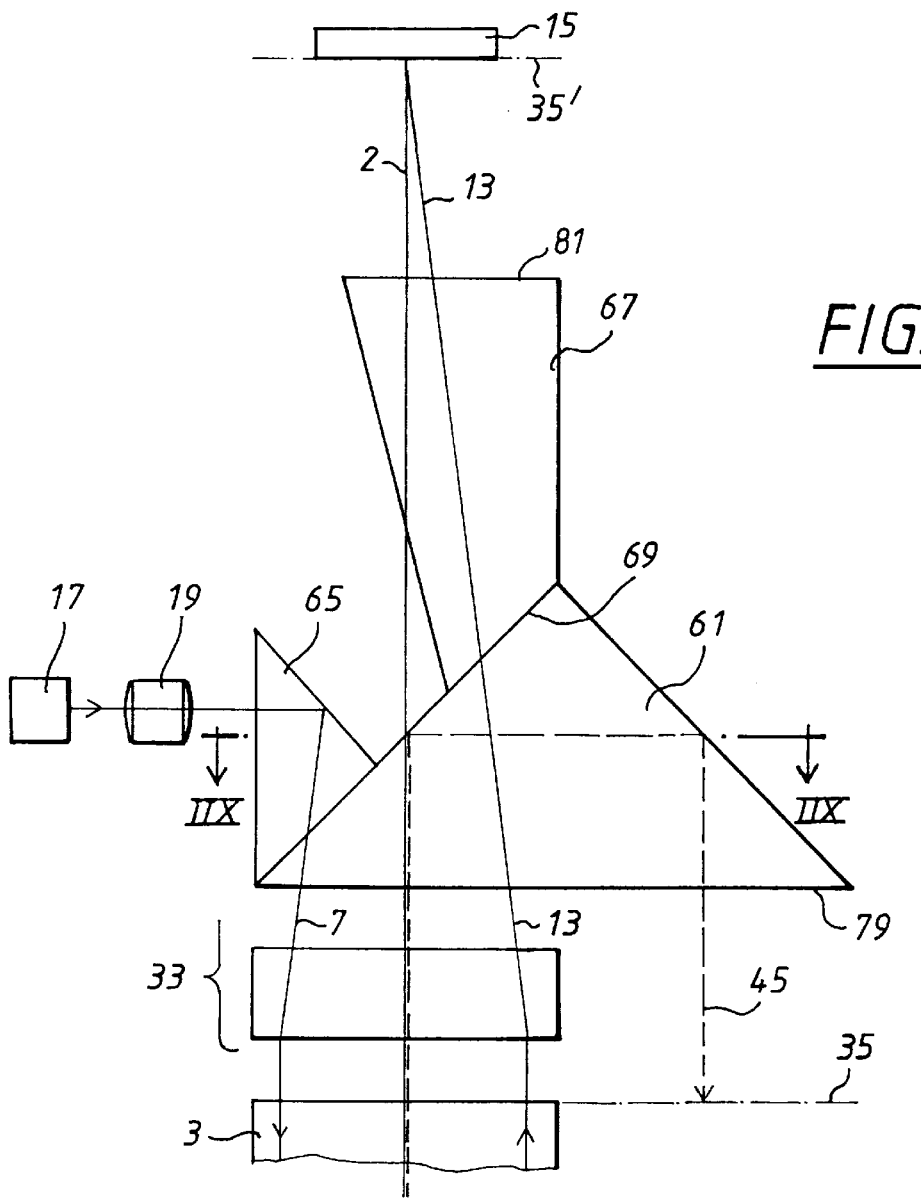
FIG. 7 shows a detail of a further embodiment according to the invention and shown in FIG. 2, in axial longitudinal section.
Figure 8:
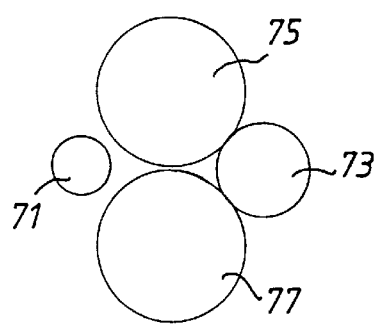
FIG. 8 shows the beam contours in the sectional plane denoted by the arrows IIX in FIG. 7.

FIGS. 7 and 8 show a detail solution for the coupling in or out in this embodiment B (FIG. 2). Elements corresponding to elements which have already been mentioned are also denoted by identical symbols in FIGS. 7 and 8. A deflecting prism belonging to the afocal reversal system is denoted by 61 in FIG. 7, and is provided for this folding. Auxiliary prisms 65 and 67 serve for coupling the autofocus beam paths in and out, respectively, and are cemented to the deflecting prism 61. These auxiliary prisms 65 and 67 are cemented to the deflecting prism 61 in a manner such that the reflecting surface 69 of the deflecting prism 61 is transparent for the autofocus beam in the region of the autofocus pupils 71 and 73, which can be seen in plan view in the sectional diagram of FIG. 8. The regions occupied by the observation beam paths are denoted by 75 and 77 in FIG. 8. The deflecting prism 61 is totally reflecting in the regions of the prism face 69 which corresponds to these observation beam regions 75 and 77.

Since the auxiliary prism 67 is constructed such that the thickness of glass through which the observation beam path 45 passes in the deflecting prism 61 is exactly as large as the thickness of glass through which the autofocus imaging beam path 13 passes in the deflecting prism 61 and the auxiliary prism 67, and furthermore such that the air distance between the prism face 79 and the intermediate image plane 35 is exactly as large as the air distance between the auxiliary prism face 81 and the detector 15, no further optical element is required for autofocus imaging on the detector 15. In other words, the detector 15 lies in an intermediate image plane 35' which is conjugate to the object plane and to the intermediate image plane 35.

A dichroic beam splitter could also be provided on the face 69 of the deflecting prism 61, for coupling the autofocus beam paths 7 and 13 in and out. This would be advantageous with regard to the autofocus pupil diameter, to the usable autofocus field, and to the usable autofocus response region.

In the further embodiment denoted by C in FIG. 2, the autofocus beam paths 7" and 13" are coupled in and out directly after the variable magnification system 3, which is afocal here, in the observation beam direction. Coupling in and out thus takes place in a region with parallel beams. Furthermore, the place of coupling in and out lies, in this embodiment C, closer to an image 83, shown in FIG. 2, of the stop 31, and this is advantageous in regard to pupil diameter and usable field region of the autofocus beam paths.

In the embodiment denoted by D in FIG. 2, the autofocus marking is imaged via the imaging beam path 13'" in one of the two video cameras 27 of the stereo microscope shown. The coupling-in of the autofocus radiation can take place, in this embodiment, selectively at positions according to embodiments A, B or C, or at further suitable positions. In this embodiment, neither a deflecting element 23 which couples the imaging beam path 13 out, nor a separate detector 15, is required. Here the wavelength of the autofocus radiation has to be matched to the sensitivity of the video camera 27. In a CCD camera, which is sensitive only in the visible, the autofocus radiation must therefore also lie in the visible, and an autofocus signal, for example, the image of the autofocus marking 9, can be formed by subtraction of the image of the object without autofocus marking 9 from the image of the object with autofocus marking 9.

Alternatively, by dividing the imaging beam paths into two partial imaging beam paths, both video cameras can also be used for autofocus detection. The projection beam path is then to be coupled-in such that the autofocus base, denoted by b in FIG. 1, is as large as possible for both video cameras, for example, coupled-in in a plane which includes an angle of 90° with the plane of the partial imaging beam paths.

When the autofocus marking 9 is imaged in both video cameras 27 of the stereo microscope, both cameras can be used synchronously, or can be selected alternately, for the operation of the autofocus arrangement. The autofocus signals from both video cameras can thereby be added for noise reduction, or use can be made of only the better of the two autofocus signals.

Although this has been described above only in connection with embodiment D, in further embodiments of the invention coupling in and out of the autofocus beam paths can take place at different regions of the microscope; in particular, the different coupling-in and coupling-out places can be combined together according to the embodiments A, B and C.

The microscope according to the invention can of course also have tubes with oculars for direct visual observation.

We claim:

1. A microscope comprising observation optics and an autofocus arrangement, wherein:

said observation optics includes an objective (1) through which at least one observation beam path passes and a variable magnification system (3) having an optical axis (2), said autofocus arrangement includes a projection beam path (7) passing through said objective (1) for projection of an autofocus marking (9) on an observation object (11) and an imaging beam path (13) passing through said variable magnification system (3) for imaging on a detector (15) said autofocus marking (9) projected onto said observation object (11), and at least one of said projection beam path (7) and said imaging beam path (13) passes through said variable magnification system (3) outside of said optical axis (2).

2. The microscope according to claim 1, wherein said projection beam path (7), said imaging beam path (13) and said at least one observation beam path respectively pass through different regions of said objective (1) and said variable magnification system (3).

3. The microscope according to claim 1, wherein at least one of said projection beam path (7) and said imaging beam path (13) at least partially pass through a region of said objective (1) and a region of said variable magnification system (3) that is passed through by said at least one observation beam path (45, 47).

4. The microscope according to claim 1, wherein said microscope is a stereo microscope having two observation beam paths that pass through different regions of said objective (1) and said variable magnification system (3).

5. The microscope according to claim 1, wherein said observation optics further includes a stop (31) in the vicinity of which at least one of:

a coupling-in device (21) couples said projection beam path (7) into said observation optics, and a coupling-out device (23) couples said imaging beam path (13) out of said observation optics and deflects said imaging beam path (13) towards said detector (15).

6. The microscope according to claim 1, wherein:

said observation optics further includes an afocal reversal system (33) through which at least one of said projection beam path (7) and said imaging beam path (13) pass and a stop (31) following said afocal reversal system (33) in the direction of said objective (1), and said afocal reversal system (33) images said stop (31) in said variable magnification system (3).

7. The microscope according to claim 1, wherein said observation optics further includes an afocal reversal system (33), said afocal reversal system having a section with convergent beam paths associated with a coupling-out device (23) that couples said imaging beam path (13) out of said observation optics (1, 3) and deflects said imaging beam path towards said detector (15).

8. The microscope according to claim 7, further including a deflecting prism (61) arranged before an intermediate image plane (35) in the direction of said at least one observation beam path (45) in said section of said afocal reversal system (33) associated with said coupling-out device (23), wherein:

said deflecting prism (61) deflects said at least one observation beam path (45), and said coupling-out device comprises a prism section (67) arranged on said deflecting prism (61) in a region of said imaging beam path such that the thickness of glass passed through in said deflecting prism (61) by said at least one observation beam path (45) is equal to the thickness of glass passed through in said deflecting prism (61) and said prism (67) by said imaging beam path (13).

9. The microscope according to claim 1, wherein said observation optics further includes an afocal reversal system (33) and between said variable magnification system (3) and said afocal reversal system (33), at least one of:

a coupling-in device couples said projection beam path (7') into said observation optics, and a coupling-out device couples-out said imaging beam path (13') from said observation optics.

10. The microscope according to claim 1, wherein said detector (15) comprises at least one electronic image pick-up unit (27), and said observation optics images said at least one observation beam path in said at least one electronic image pick-up unit (27).

11. The microscope according to claim 10, wherein said autofocus arrangement evaluates an autofocus signal formed by subtraction of an image of said observation object (11) without autofocus marking (9) from an image of said observation object (11) with autofocus marking (9).

* * * * *